// United States Larson

[11] 3,913,389
[45] Oct. 21, 1975

[54] OVERTURNING MOMENT COMPENSATION IN A MULTIPLE ACTUATOR CONTROL OF A RIGID TABLE

[75] Inventor: Rodney L. Larson, Minnetonka, Minn.

[73] Assignee: MTS Systems Corporation, Minneapolis, Minn.

[22] Filed: July 29, 1974

[21] Appl. No.: 492,451

[52] U.S. Cl. .................................................. 73/71.6
[51] Int. Cl.² ......................................... G01N 29/00
[58] Field of Search......... 73/71.6, 71.5 R, 67, 67.2, 73/71.4; 318/564

[56] References Cited
UNITED STATES PATENTS
3,393,555   7/1968   Flannelly ............................. 73/71.6
3,477,281  11/1969   Helmuth .............................. 73/71.6
3,654,804   4/1972   Helmuth .............................. 73/71.6
3,800,588   4/1974   Larson et al. ....................... 73/71.6

OTHER PUBLICATIONS
Newton, Jack, *Shock and Vibration Bulletin*, "Methods of Control of Multiple Shaker Testing System," Jan. 1966, No. 35, Part 2, pp. 85-96.

Primary Examiner—Richard C. Queisser
Assistant Examiner—Stephen A. Kreitman
Attorney, Agent, or Firm—Dugger, Johnson & Westman

[57] ABSTRACT

A circuit for compensating for overturning moments on a combined test table and specimen that is being controlled in both horizontal and vertical planes where the center of gravity of the combination is above the plane of horizontal force, to offset the tendency of the table to tip because of the overturning moment created.

5 Claims, 3 Drawing Figures

OVERTURNING MOMENT COMPENSATION IN A MULTIPLE ACTUATOR CONTROL OF A RIGID TABLE

BACKGROUND OF THE INVENTION

1. Field of the Invention

The present invention relates to the control of multiple actuator vibrating test tables and in particular means for compensating for offset of the center of gravity of the test device from one of the lines of force on the table.

2. Prior Art

A vibrating table used for testing specimens with multiple actuators is disclosed in U.S. Pat. No. 3,800,588. The table shown in that particular patent is actuated only in a vertical direction, but the patent does show the type of rigid table used for testing specimens, and also generally the controls required. Additionally, U.S. patent application of Niel R. Petersen Ser. No. 470,631, filed May 16, 1974 for Pressure Balanced Hydrostatic Slip Bearing Used In A Guide And Restraint System, assigned to the same assignee as this application, illustrates a rigid table being vibrated in both horizontal and vertical directions and being guided by hydrostatic slip bearings. When a table of the general form shown in said application Ser. No. 470,631 is loaded with a specimen, the center of gravity of the specimen is generally raised a distance above the central plane of the table, and in other words above the line or plane along which the horizontal actuators are acting. The present disclosure deals with a device for compensating for overturning moment errors that can arise when a unit is supported on actuators and is vibrated in two directions and wherein the center of gravity if offset from the line of action in at least one of the directions.

SUMMARY OF THE INVENTION

The present invention relates to a control system for rigid vibration tables having actuators supporting the table and for vibrating it in a generally vertical direction, and also separate actuators for vibrating the table in a horizontal direction, and for compensating for an offset center of gravity of the table and specimen from the general line or plane of horizontal force application. More generally, the invention relates to means for compensating for the overturning moment occasioned by having the center of gravity of a vibrating structure offset from one of the lines or planes of action is disclosed.

In the present system, where a rigid table is being vibrated simultaneously in two directions, for example the vertical and horizontal directions, the vertical actuators support the table and specimen at the same time the table is reciprocated in a horizontal direction. The specimen added to the table generally raises the center of gravity of the combined specimen and table above the line of action of the horizontal actuators. Then, the table and specimen, which are supported by the hydraulic oil pressure in the vertical actuators, will tend to tip about a horizontal axis when vibrated in horizontal direction because of the moment created by the offset center of gravity. This tipping tendency has to be resisted by the vertical actuators.

The resistance to overturning must be in addition to the normal control of the vertical actuators. In many applications the dynamic compliance of the vertical actuators allows an undesired rotation of the table whenever linear horizontal inputs are applied to the specimen. Such rotation represents an uncontrolled table motion which if uncompensated can make specimen analysis very difficult.

The present device relates to a control system which provides a compensating signal for the vertical actuators based upon the rate of change of force of the horizontal actuators to resist the overturning moment and keep the table generally horizontal and well within the needed control parameters.

Where a rate of change of horizontal force signal is added to the vertical actuator control signals, any overturning moment will be anticipated in the vertical excitation system and almost no motion will result in the vertical actuators. The only change will be a difference in the pressure within the vertical actuators on opposite sides of a vertical plane passing through the center of gravity.

It is to be noted that in the system disclosed, compensation is dynamic and that the compensation signal which is a function of the rate of change of horizontal force is added or subtracted to the appropriate drive signals for the vertical actuator flow control servo valves so that the compensation signal will appear as an oil velocity correction at the servo valve. The compensation signal can be added to any number of actuators, and whether or not the signal adds to the oil velocity flowing through the servo valve for an actuator or detracts from the velocity, depends on the orientation of the respective actuators with respect to the axis about which the overturning moment tends to act.

In the following specification, the vertical upward movement is indicated as being a plus force. A plus displacement on the vertical actuators indicates a displacement upwardly from the centered position of the actuators. Likewise, in FIG. 1, the movement in the horizontal direction to the right is indicated as a plus displacement from a centered position of the horizontal actuator and a plus force (or plus differential pressure) on the horizontal actuator will cause movement of the actuator to the right.

DESCRIPTION OF THE PREFERRED EMBODIMENT

Figure 1:
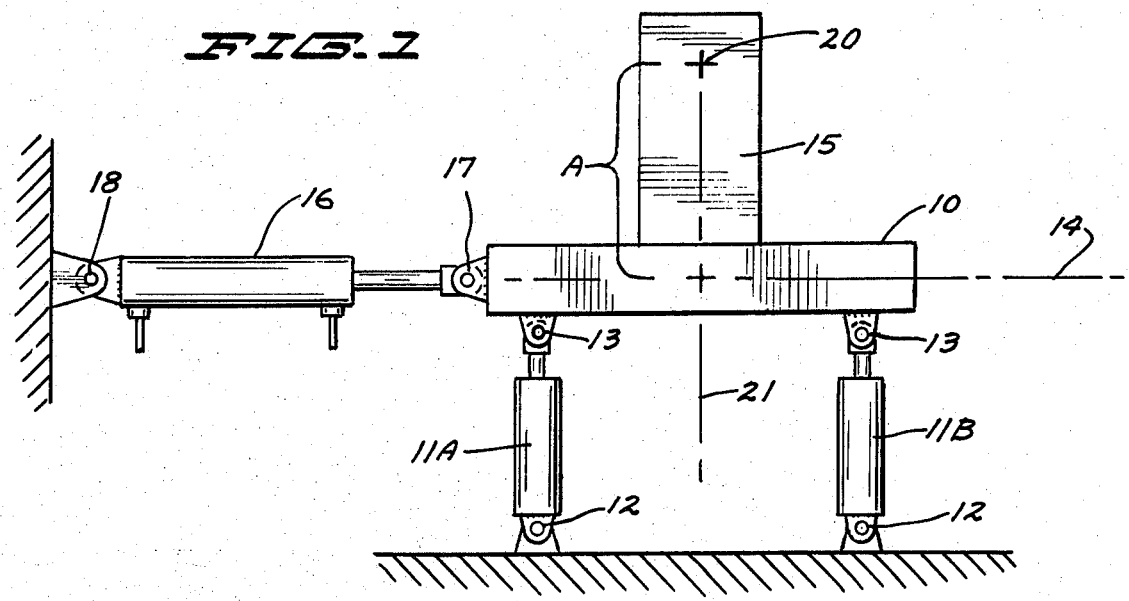
FIG. 1 is a side elevational part schematic view of a typical test table showing a schematic representation of a specimen on the table.

A test table 10, shown in side view in FIG. 1, is a rectangular table in plan view as shown in the aforementioned U.S. Pat. No. 3,800,588 and is a rigid table that is supported on a plurality of vertical hydraulic actuators 11, and these actuators as shown are positioned adjacent opposite ends of the table. In addition to the two actuators 11 shown, there could be additional actuators positioned at the other corners of the rectangular table 10 as shown in the aforementioned U.S. patent. Usually there are at least four such actuators, one at each corner. The compensation signals may be identical for all actuators symmetrically located with respect to the overturning axis, and on the same side of the axis or they may be scaled in approximate proportion to the radius of action from the described rotation axis. The actuators 11A and 11B are mounted on support pins 12, and are pivotally connected as at 13 to the underside of the table 10 as well. This mounting permits the table to be shifted or vibrated in a horizontal direction, along a horizontal plane 14 at the same time the table is reciprocated in vertical direction by the actuators 11A and 11B. A specimen indicated by a block 15 is mounted on the top of the table 10 and is secured to the table for vibration in a vertical direction, and at the same time for vibration in a horizontal direction. The horizontal vibration along the force line lying as shown in plane 14 is provided by a horizontal actuator 16 that is connected as at 17 to one end of the table 10, and at its base end the actuator is connected as at 18 to a suitable support or foundation. The horizontal actuator 16 is a double acting hydraulic actuator reciprocated at a desired frequency and the force from the actuator 16 acts along a line lying in the plane 14. The vertical force acts at right angles to the horizontal force, in a direction parallel to a central vertical plane 21 so the specimen 15 simultaneously is vibrated in two mutually perpendicular directions.

In most instances, when the specimen 15 is attached to the table 10, the center of gravity of the combined table and specimen together comprising a test device, will be shifted a substantial distance above the line of horizontal force of the horizontal actuators. For purposes of illustration, the center of gravity is illustrated at 20 on the specimen 15, and the distance above the line of action of the horizontal force and the center of gravity is represented by the distance A in FIG. 1.

It can thus be seen that the movement of the test device including the table and specimen, in horizontal direction would tend to create an overturning moment on the table because of the offset of the center of gravity 20 from the line of force in horizontal direction. This moment is resisted only by the vertical actuators 11, in that they support the table and specimen in vertical direction as they vibrate the table. The table 10 thus tends to tip or deviate from its horizontal plane of movement.

In order to counteract the overturning moment, the vertical actuators 11 must produce forces which act about the effective radii of action of the actuators with respect to the central axis which is at the intersection of planes 14 and 21.

In order to provide the vertical actuators with a signal which will anticipate and counteract the overturning moment, the measured horizontal force, which is derived from a differential pressure transducer on the servo valve of the horizontal actuator 16, is differentiated to produce a signal indicating a rate of change of horizontal force signal that provides an anticipatory control to the servo valves for the vertical actuator.

Figure 2:
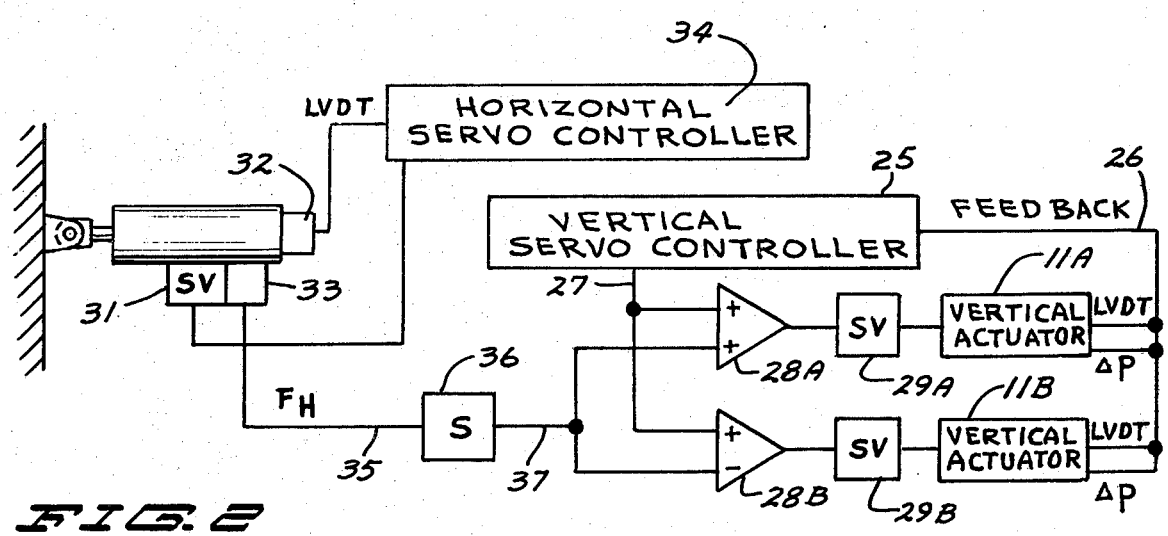
FIG. 2 is a schematic representation of a control system providing the overturning moment compensation of the present invention.

As shown in FIG. 2, a type of control loop in simplified form is illustrated. The vertical actuators are controlled by servo valves and servo controllers, and reference is made to copending U.S. application Ser. No. 492448, filed July 29, 1974 for Multiple Actuator Control System in which I am a coinventor. In that application vertical servo controllers are utilized to actuate vertical actuators on a rigid table, and such servo controllers can be utilized in the present system for controlling the vertical actuators. As shown, the vertical servo controller is illustrated generally at 25 and includes a command source and receives feedback signals from the actuators 11A, 11B along the feedback line 26. This feedback comprises separate force (differential pressure) signals and displacement signals (LVDT). The single line representation is used for convenience but separate wires carry the separate feedback signals for each actuator. A line 27 is used for providing control signals for each actuator. The line 27 provides the necessary individual signals for separately controlling the actuators, as shown in said U.S. application Ser. No. 492,448. Control signals are provided from the servo controller to one input of a first summing amplifier 28A and to one input of a second summing amplifier 28B. A plurality of separate inputs can be provided, and these amplifiers 28 correspond to the amplifiers 100 in said application Ser. No. 492,448.

The amplifiers 28A and 28B in turn provide control signals to drive servo valves 29A and 29B, respectively, to in turn control the actuators 11A and 11B (and other vertical actuators) for the desired movement.

The horizontal actuator 16, as shown, has a servo valve 31 for controlling its movement, and a stroke feedback control 32 (LVDT) as well as a differential pressure transducer 33 (P or force) on the valve. The transducer or control 32 provides stroke feedback to the horizontal servo controller 34. The controller 34 is used to command and control the horizontal movement of the table in a reciprocal path in a known manner. The differential pressure transducer 33 provides feedback signals to the controller 34 and also along a line 35. The signal is represented by $F_H$ on line 35 meaning the force exerted in horizontal direction (the differential pressure gives a signal proportional to the force being exerted by the actuator 16). This signal $F_H$ along line 35 is a differentiated by a differentiator 36 of suitable design to provide a rate signal on the output line 37 of the differentiator. This rate signal represents the rate of change of the force exerted by the actuator 16. The signal on line 37 is then provided to a positive input terminal of summing amplifier 28A so that the rate of change of force of the horizontal actuator or actuators is an additive signal for the servo valve 29A for the actuator 11A, and the signal along line 37, comprising the rate of change of force of the horizontal actuator, is supplied to an inverting terminal to the amplifier 28B so that it is subtracted from the signal normally supplied to the servo valve 29B. In other words, the rate of change signal is an additive signal to the actuators on one side of the vertical plane 21, and is a deductive signal from the servo valve control signal on the opposite side of the plane 21. It should be understood that servo valves are flow control devices for controlling the rate of flow of fluid under pressure to the actuators. Thus an additive signal will increase the rate of flow through the servo valve 29A, while the subtracted or inverted signal will deduct from the flow through the servo valve 29B, if the signal from differentiator 36 is positive. Of course, the rate of change signal may also be negative.

Ideally, the compensation signal will be anticipatory so that the vertical actuators will not deviate from their desired displacement and the table will always remain horizontal or in some other proper orientation. Any additional flow of hydraulic oil will be compressed in the actuators on one side of the control axis to provide for the correct torque to overcome the overturning moment while the flow is reduced to the actuators on the opposite side of the control axis. Thus, the rate signal appears as an oil velocity correction applied to the servo valve controls, and the actuators 11A, 11B perform an effective integration of the servo valve flow. With no actuator motion of the vertical actuators 11A and 11B, the oil flow into or out of the actuators will increase or decrease the static differential pressure as follows:

$\Delta V = (V_T P/K)$, where $\Delta V$ is the volume of compressed oil added, $V_T$ is the total volume of oil, $P$ is the pressure of the hydraulic fluid or oil, and $K$ is the bulk modulus of the oil. If the displacement change of the actuators is zero, the following equation applies: $\Delta V = Q_{sv} dt$, where $Q_{sv}$ is the servo valve flow.

Figure 3:
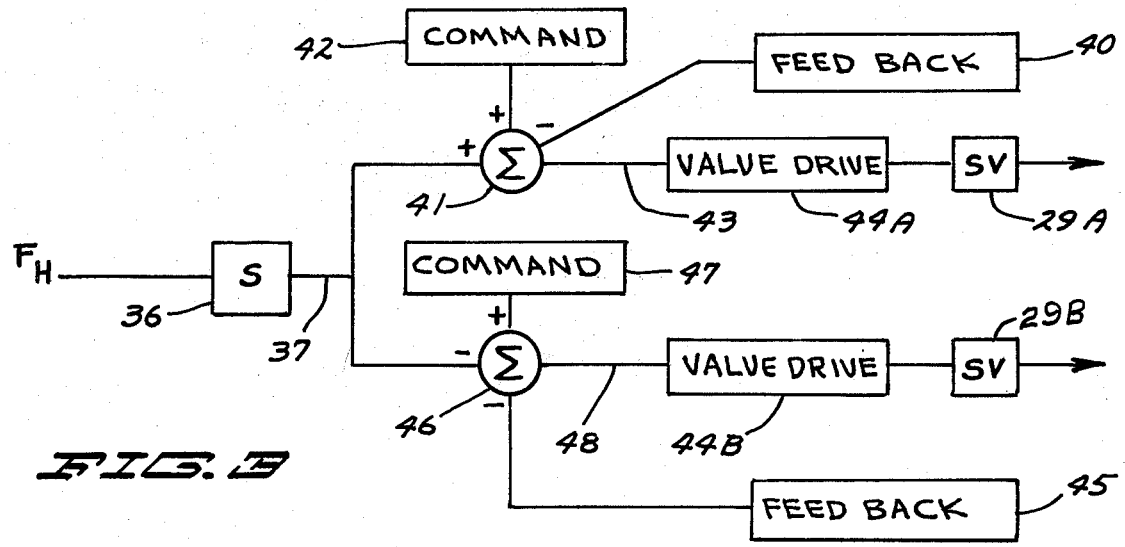
FIG. 3 is a modified form of a control utilizing the overturning moment compensation signal in a different servo loop control.

In FIG. 3, a modified form of controls utilizing the rate signal on line 37 from differentiator 36 is shown. In FIG. 3, the feedback from the actuators 11A is indicated by box 40 and is provided to a summing junction 41 for the control of actuator 11A. A command signal source 42 provides a command signal to this summing junction. The positive input from line 37 is provided to another input of the summing junction 41, and the output of summing junction 41 along line 43 goes to a valve drive amplifier 44A, which in turn powers the servo valve 29A.

For the other channel, namely the vertical actuator 11B, a feedback signal from circuitry 45 is provided to a summing junction 46, as well as a command signal from a source 47. The signal from line 37 is provided to an inverting input of the summing junction 46, and an output from the summing junction 46 along a line 48 is provided to a valve drive amplifier 44B which drives servo valve 29B.

FIG. 3 is thus a simplified servo control loop schematic which shows that the rate of change of force signal on line 37 from the actuators operating in a different direction of movement from the actuators being modified will provide a velocity control signal for the servo valves of the respective vertical actuators to also overcome or compensate for an overturning moment. The rate of change of horizontal force signal provided to the vertical excitation system anticipates the overturning moment and also is the most appropriate signal to the respective servo valves for the vertical actuators to counteract any motion of these actuators. In other words, the signal counteracts the tendency of one of the actuators to compress from the overturning moment because of the increased load on the actuator due to the overturning moment.

In the general case, the control compensates for eccentric center of gravity loadings where a structure is being moved in two mutually perpendicular directions, and is supported by actuators for movement in one of the directions wherein the center of gravity is offset in the one direction from a plane lying along the second direction.

What is claimed is:

1. A control system for a test apparatus comprising a test device, a plurality of first actuator means for supporting said test device and for reciprocating said test device in opposite directions along a first axis, second means for vibrating said test device in opposite directions along a second axis substantially perpendicular to said first axis, said second means applying force along a force line that is spaced in a direction along the first axis from the center of gravity of said test device, some of said first actuator means being spaced on said test device along said direction of force line from said second means, first control means connected to control said first actuator means and second control means connected to control said second means, and means to provide signals to said first control means to compensate for overturning moments acting on said first actuator means due to the offset of the center of gravity from said force line of said second means including feedback means connected to the second means to determine the force exerted by said second means, means connected to said feedback means to provide a signal indicating the rate of change of said force exerted by said second means to modify the operation of said first actuator means as a function of said rate of change signal.

2. A control system for a test apparatus comprising a test device, first actuator means for supporting said test device for reciprocating movement in opposite directions along a generally vertical line, and second actuator means mounted to also reciprocate said test device along a generally horizontal force application line, said test device having a center of gravity offset vertically from the force application line of said second actuator means, means connected to control said actuator means including means to compensate for overturning moments on said test device tending to tip said test device comprising means for providing a first signal indicating the rate of change of force exerted by said second actuator means, and means to connect said means for providing said first signal to control operation of said first actuator means so as to tend to counteract differences in force required on separate first actuator means to balance moments created on said first actuator means about an axis between said first actuator means due to the offset of the center of gravity of said test device from the line of force of said second actuator means.

3. The combination specified in claim 2 wherein said means to connect the means to provide said first signal includes means to control said first actuator means in a desired reciprocating path, and wherein said first signal is supplied to actuator means on one side of the axis about which the overturning moment is exerted in a first polarity and provided to actuator means on the opposite side of said axis in an opposite polarity.

4. The combination as specified in claim 2 wherein means to provide a rate of change of force signal for said second actuator means comprises means to provide a force signal indicating the force applied by said second actuator means, and means connected to differentiate said force signal.

5. The combination as specified in claim 2 wherein said center of gravity is offset in a vertical direction on an opposite side of the line of force from said second actuator means than the first actuator means.

* * * * *